US012725275B2

(12) United States Patent
Li et al.

(10) Patent No.: US 12,725,275 B2
(45) Date of Patent: Sep. 1, 2026

(54) TARGET OBJECT TRACKING METHOD, DEVICE, APPARATUS, AND STORAGE MEDIUM

(71) Applicant: Shenzhen Future Network of Intelligence Institute (FNii-Shenzhen), Shenzhen (CN)

(72) Inventors: Zhen Li, Shenzhen (CN); Chaoda Zheng, Shenzhen (CN); Jiantao Gao, Shenzhen (CN); Xu Yan, Shenzhen (CN); Weibing Zhao, Shenzhen (CN); Yinghong Liao, Shenzhen (CN); Shuguang Cui, Shenzhen (CN)

(73) Assignee: Shenzhen Future Network of Intelligence Institute (FNii-Shenzhen), Shenzhen (CN)

(*) Notice: Subject to any disclaimer, the term of this patent is extended or adjusted under 35 U.S.C. 154(b) by 300 days.

(21) Appl. No.: 18/518,423

(22) Filed: Nov. 22, 2023

(65) Prior Publication Data

US 2024/0087139 A1 Mar. 14, 2024

Related U.S. Application Data

(63) Continuation of application No. PCT/CN2022/108123, filed on Jul. 27, 2022.

(51) Int. Cl.
*G06T 7/20* (2017.01)
*G06T 17/00* (2006.01)
(Continued)

(52) U.S. Cl.
CPC ................ *G06T 7/20* (2013.01); *G06T 17/00* (2013.01); *G06V 10/25* (2022.01); *G06V 10/44* (2022.01)

(58) Field of Classification Search
CPC ........... G06T 7/20; G06T 17/00; G06T 7/246; G06V 10/25; G06V 10/44; G06V 10/806; G06V 20/58; G06V 10/62; G06V 10/82
See application file for complete search history.

(56) References Cited

U.S. PATENT DOCUMENTS

2019/0387185 A1* 12/2019 Hicks .................... G06F 18/241
2023/0222677 A1* 7/2023 Georgis .................... G06T 7/20 382/100
2024/0290059 A1* 8/2024 Zhang .................. G11B 27/031

FOREIGN PATENT DOCUMENTS

CN 109309813 A * 2/2019 ............. G08B 21/02
CN 110969648 B * 5/2022 ............. G06T 7/251

(Continued)

*Primary Examiner* — Amandeep Saini
*Assistant Examiner* — Andrew S Budisalich

(57) ABSTRACT

The present disclosure provides a target object tracking method. In this disclosure, the point cloud data sequence in the target scene is collected by lidars and the first frame of cloud point data is extracted; the bounding box of the target object in the first frame of cloud point data is determined using the preset three-dimensional target tracking algorithm. All the target point clouds in the bounding box are extracted to generate the first template point cloud. The template expansion processing is performed using the preset ATG algorithm to obtain the second template point cloud. The point cloud features in the search area of other frames of point cloud data are extracted, and are compared with the second template point cloud and the reference template point cloud to obtain the comparison result. Based on the comparison result, the tracking result of the target object is generated and displayed.

20 Claims, 7 Drawing Sheets

(51) Int. Cl.
*G06V 10/25* (2022.01)
*G06V 10/44* (2022.01)

(56) References Cited

FOREIGN PATENT DOCUMENTS

| | | | | | |
|---|---|---|---|---|---|
| CN | 116430338 A | * | 7/2023 | ............... | G01S 7/41 |
| CN | 114612529 B | * | 9/2024 | ............... | G06T 7/33 |

* cited by examiner

TARGET OBJECT TRACKING METHOD, DEVICE, APPARATUS, AND STORAGE MEDIUM

CROSS-REFERENCE TO RELATED APPLICATIONS

The present application is a Continuation application of PCT Application No. PCT/CN2022/108123, filed on Jul. 27, 2022, the entire contents of which are hereby incorporated by reference.

FIELD

The present invention relates to computer technologies, and more particularly, to a target object tracking method, device, apparatus, and storage medium.

BACKGROUND

Single object tracking (SOT) is a key problem in many applications, such as visual monitoring and video analysis. SOT has become a research hotspot in the field of computer vision. In a given bounding box of a target object in a first frame, the goal of SOT is to position the same target object in all other frames. In recent years, SOT based on two-dimensional images has made great progress by using twin network. However, compared with two-dimensional images with regular and well-organized pixels, most three-dimensional data is in the form of point cloud, which is irregular, disordered, and often sparse. Therefore, the existing twin network cannot be applied directly. Especially in the automatic driving or robot perception scene in which lidars are used as the main sensors, the three-dimensional data cannot be processed by the two-dimensional technology, which brings great challenges in implementation. To solve this problem, SC3D is developed. In order to adapt the twin network to the 3D SOT task, SC3D uses a Kalman filter to generate redundant target candidate boxes from the search area. Subsequently, by measuring a cosine similarity between a candidate box feature and a template feature, a similarity score can be obtained from the 3D twin network. The candidate box with the highest score is then treated as the final bounding box.

Although the above method can achieve high performance to a certain extent, the method is prone to failure when the appearance of the target object changes rapidly. Therefore, in order to enhance the tracking of the target object appearance, an auxiliary network for shape completion is provided, or the target point cloud in the first frame and the previous frame are simply fused. However, in the scene with sparse targets, due to limited feature information, the target object still cannot be identified even with feature enhancement.

SUMMARY

Therefore, the present disclosure provides a target object tracking method, device, apparatus, and storage medium, aiming to solve the problem that the target object cannot be identified and tracked in a scene in which lidars are sparse and template information is insufficient.

In a first aspect of the present disclosure, a target object tracking method is provided, including:

collecting a point cloud data sequence in a target scene by radars, and extracting a first frame of point cloud data from the point cloud data sequence, wherein the point cloud data sequence has at least two frames of point cloud data;

determining a bounding box of a target object in the first frame of point cloud data using a preset three-dimensional target tracking algorithm according to the target, and extracting all target point clouds in the bounding box to generate a first template point cloud;

based on the first template point cloud, performing a template expansion processing using a preset adaptive template generation algorithm based on the bounding box to obtain a second template point cloud;

extracting point cloud features in a search area of other frames of point cloud data in the point cloud data sequence, and comparing the point cloud features with the second template point cloud and a reference template point cloud corresponding to the target object to obtain a comparison result; and generating a tracking result of the target object in the point cloud data sequence based on the comparison result and displaying the tracking result.

In an embodiment, the based on the first template point cloud, performing a template expansion processing using a preset adaptive template generation algorithm based on the bounding box to obtain a second template point cloud bounding box includes:

determining whether a density of point clouds in the first template point cloud meets a preset density threshold to obtain a first judgment result;

based on the first judgment result, generating the second template point cloud using the preset adaptive template generation algorithm by taking a center point of the bounding box as an origin and selecting several point clouds meeting a preset restricting condition from the point clouds surrounding the origin.

In an embodiment, the adaptive template generation algorithm includes a region fixed cropping generation strategy and a point fixed cropping generation strategy; the based on the first judgment result, generate the second template point cloud using the preset adaptive template generation algorithm to by taking center point of the bounding box as an origin and selecting several point clouds meeting a preset restricting condition from point clouds surrounding the origin includes:

if the first judgment result indicates the calculated density meets the preset density threshold, generating the second template point cloud using the region fixed cropping generation strategy by taking the center point of the bounding box as the origin and selecting point clouds which are distant from the origin within a first preset value; and if the first judgment result indicates the calculated density does not meet the preset density threshold, generating the second template point cloud using the point fixed cropping generation strategy by taking the center point of the bounding box as the origin and selecting a preset number of point clouds, wherein an Euclidean distance between the preset number of point clouds and the origin meets a second preset value.

In an embodiment, the based on the first judgment result, generating the second template point cloud using the preset adaptive template generation algorithm by taking center point of the bounding box as an origin and selecting several point clouds meeting a preset restricting condition from point clouds surrounding the origin includes:

constructing a point cloud matrix based on the selected point clouds;

determining whether each point cloud in the point cloud matrix is located in the bounding box to obtain a second judgment result;

based on the second judgment result, converting the point cloud matrix into a target mask; and fusing the target mask and the second template point cloud to obtain a first enhanced template point cloud.

In an embodiment, the based on the first judgment result, generating the second template point cloud using the preset adaptive template generation algorithm by taking center point of the bounding box as an origin and selecting several point clouds meeting a preset restricting condition from point clouds surrounding the origin further includes:

obtaining a historical template point cloud of the target object, and aggregating the historical template point cloud and a corresponding reference frame to obtain historical template features of the target object; and fusing the historical template features and the second template point cloud to obtain a second enhanced template point cloud.

In an embodiment, the extracting point cloud features in a search area of other frames of point cloud data in the point cloud data sequence, and comparing the point cloud features with the second template point cloud and a reference template point cloud corresponding to the target object to obtain a comparison result includes:

extracting the point cloud features in the search area of other frames of point cloud data in the point cloud data sequence;

inputting the first enhanced template point cloud, the second enhanced template point cloud and the reference template point cloud corresponding to the target object into a preset feature extractor for feature extraction, and fusing the extracted template features to obtain enhanced template features; and inputting the point cloud features and the enhanced template features into a preset regional proposal network for voting and proposal processing to obtain the comparison result.

In an embodiment, the aggregating the historical template point cloud and a corresponding reference frame to obtain historical template features of the target object includes:

extracting the features of the historical template point cloud and the corresponding historical reference frame respectively using a preset feature extractor to obtain multiple historical features of the historical template point cloud and historical reference template features;

calculating a paired distance between each historical feature and the corresponding historical reference template feature using a distance calculation formula;

selecting the first K reference features which are most similar to each template feature from the historical reference frame based on the paired distance using a K-nearest neighbor algorithm and constructing K pairs of similar template features;

fusing the K pairs of similar template features using a multi-level neural network to obtain the historical template features of the target object;

wherein, the distance calculation formula is:

$$FDist \in \mathbb{R}^{M_1 \times M_1} = \text{Pairwise}(F^r, F^t),$$

wherein $M_1$ represents the number of the features in the reference and template, FDist represents a distance map of a $$M_1 \times M_1, f_i^t \in F^t$$

represents that $$f_i^t$$

is an i-th template feature of a template feature set $$F^t, f_i^r \in F^r$$

represents that $$f_i^r$$

is an i-th reference feature of a reference feature set $F^r$, and $FDist_{i,j}$ indicates the distance between $$f_i^t \in F^t \text{ and } f_i^r \in F^r.$$

In a second aspect of the present disclosure, a target object tracking device is provided, including:

a collection module, configured to collect a point cloud data sequence in a target scene by radars, and extract a first frame of point cloud data from the point cloud data sequence, wherein the point cloud data sequence has at least two frames of point cloud data;

an extraction module, configured to determine a bounding box of a target object in the first frame of point cloud data using a preset three-dimensional target tracking algorithm according to the target object, and extract all target point clouds in the bounding box to generate the first template point cloud;

an expansion module, configured to perform a template expansion processing based on the first template point cloud using a preset adaptive template generation algorithm based on the bounding box to obtain a second template point cloud;

a tracking module, configured to extract point cloud features in a search area of other frames of point cloud data in the point cloud data sequence, and compare the extracted point cloud features with the second template point cloud and a reference template point cloud corresponding to the target object to obtain a comparison result; and a generation module, configured to generate a tracking result of the target object in the point cloud data sequence based on the comparison result and displaying the tracking result.

In an embodiment, the expansion module includes:

a first judgment unit, configured to determine whether a density of the point clouds in the first template point cloud meets a preset density threshold and obtain a first judgment result;

an expansion unit, configured to, based on the first judgment result, generate the second template point cloud using the preset adaptive template generation algorithm by taking a center point of the bounding box as an origin and selecting several point clouds meeting the preset restricting condition from the point clouds surrounding the origin.

In an embodiment, the adaptive template generation algorithm includes a region fixed cropping generation strategy and a point fixed cropping generation strategy, and the expansion unit is configured to:

if the first judgment result indicates that the density of the point clouds in the first template point cloud meets the preset density threshold, generate the second template point cloud using the region fixed cropping generation strategy by taking the center point of the bounding box as the origin and selecting a preset number of point clouds which are distant from the origin within a first preset value; and if the first judgment result indicates that the density of the point clouds in the first template point cloud does not meet the preset density threshold, generate the second template point cloud using by taking the center point of the bounding box as the origin and selecting a preset number of point clouds surrounding the origin, wherein an Euclidean distance between the preset number of point clouds and the origin meets a second preset value.

In an embodiment, the expansion module further includes a first enhancement unit configured to:

construct a point cloud matrix based on the selected point clouds;

determine whether each point cloud in the point cloud matrix is located in the bounding box to obtain a second judgment result;

based on the second judgment result, covert the point cloud matrix into a target mask; and fuse the target mask and the second template point cloud to obtain a first enhanced template point cloud.

In an embodiment, the target object tracking device also includes a cross-frame aggregation module configured to:

obtain a historical template point cloud of the target object, and aggregate the historical template point cloud and a corresponding historical reference frame to obtain historical template features of the target object; and according to the historical template features and the second template point cloud, obtain a second enhanced template point cloud.

In an embodiment, the tracking module includes:

a search unit, configured to extract point cloud features in the search area of other frames of point cloud data in the point cloud data sequence;

a second enhancement unit, configured to input the first enhanced template point cloud, the second enhanced template point cloud and the reference template point cloud corresponding to the target object into a preset feature extractor for feature extraction, and perform fusion processing on the extracted template features to obtain enhanced template features; and a tracking processing unit, configured to input the point cloud features and the enhanced template features into a preset regional proposal network for voting and proposal processing to obtain the comparison result.

In an embodiment, the cross-frame aggregation module is configured to:

extract the features of the historical template point cloud and the corresponding historical reference frame respectively using the preset feature extractor to obtain multiple historical features of the historical template point cloud and historical reference template features;

calculate a paired distance between each historical feature and the corresponding historical reference template feature using a distance calculation formula;

select the first K reference features which are most similar to each template feature from the historical reference frame based on the paired distance using a K-nearest neighbor algorithm and construct K pairs of similar template features; and fuse the K pairs of similar template features using a multi-level neural network to obtain the historical template features of the target object.

Wherein the distance calculation formula is as follows:

$$FDist \in \mathbb{R}^{M_1 \times M_1} = \text{Pairwise}(F^r, F^t),$$

Wherein $M_1$ represents the number of the features in the reference and the template, FDist represents a distance map of a $$M_1 \times M_1,\ f_i^t \in F^t$$

represents that $$f_i^t$$

is an i-th template feature of a template feature set $$F^t,\ f_i^r \in F^r$$

represents that $$f_i^r$$

is an i-th reference feature of a reference feature set $F^r$, and $FDist_{i,j}$ indicates the distance between $$f_i^t \in F^t \text{ and } f_i^r \in F^r.$$

In a third aspect of the present disclosure, an electronic apparatus is provided; the electronic apparatus has a memory, a processor, and a computer program stored in the memory and capable of running in the processor, wherein, when being executed by the processor, the computer program implements the steps in the above target object tracking method.

In a fourth aspect of the present disclosure, a computer-readable storage medium with a computer program stored thereon is provided, wherein, when being executed by the processor, the computer program implements the steps in the above target object tracking method.

In the target object tracking method of the present disclosure, the point cloud data sequence in the target scene is collected by lidars and the first frame of cloud point data is extracted from the point cloud data sequence; the bounding box of the target object in the first frame of cloud point data is determined according to the target object using the preset three-dimensional target tracking algorithm. All the target point clouds in the bounding box are extracted to generate the first template point cloud. Based on the first template point cloud, the template expansion processing is performed using the preset adaptive template generation algorithm based on the bounding box to obtain the second template point cloud. The point cloud features in the search area of other frames of point cloud data in the point cloud data sequence are extracted, and the point cloud features are compared with the second template point cloud and the reference template point cloud corresponding to the tracking target to obtain the comparison result. Based on the comparison result, the tracking result of the target object in the point cloud data sequence is generated and displayed. Therefore, the template is expanded based on the adaptive template generation algorithm, so that the context information in the tracking scene can be used to support the identification of the target object, and the noise in different environments can be eliminated even in the scene with sparse targets, which rapidly and accurately positions and identifies the target object.

BRIEF DESCRIPTION OF THE DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DETAILED DESCRIPTION

Figure 1:
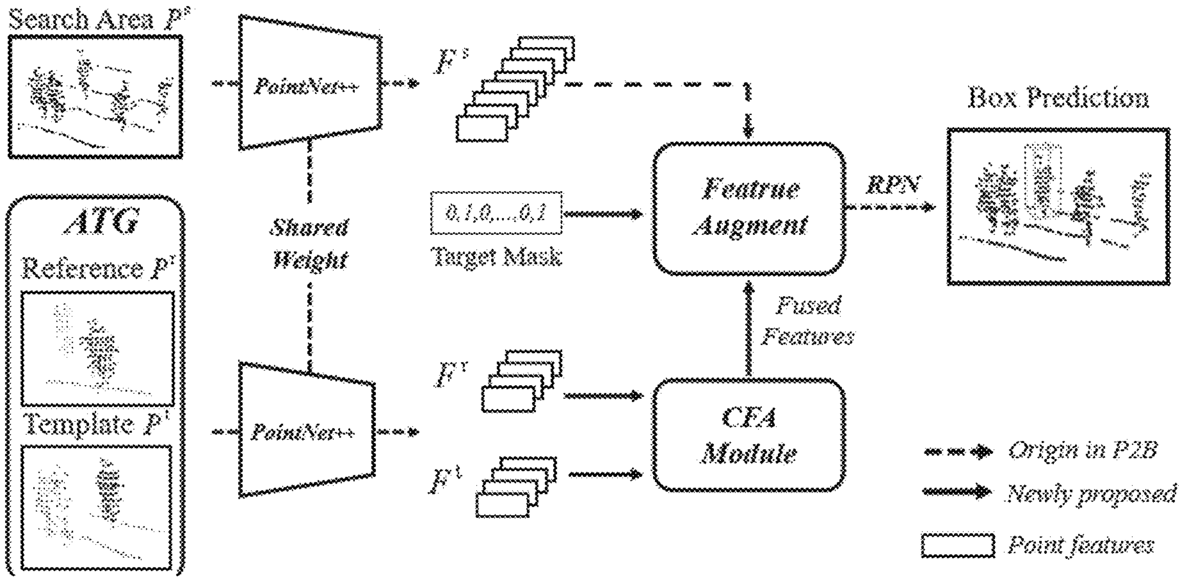
FIG. 1 is a schematic diagram of a target object tracking method of the present disclosure.

In order to realize the rapid identification of a target object even in a scene with sparse target object features, the present disclosure provides a context-aware tracking (CAT) solution, which makes use of spatial context information and temporal context information of a lidar sequence to better learn identifiable feature representations. Specifically, in the solution, a cross-frame aggregation (CFA) module is provided for aggregating historical information, and CAT is capable of selecting a template from reference frames and aggregating the most similar features by the CFA module through an adaptive template generation (ATG) algorithm using information surrounding the target object. Therefore, CAT can explore useful information from the lidar sequence and eliminate noise in different environments, so as to realize rapid position, identification and tracking of the target object.

The terms "first", "second", "third", "fourth", if any, in the specification and claims of the invention and in the drawings attached above are used to distinguish similar objects and need not be used to describe a particular order or sequence. It should be understood that the data thus used are interchangeable where appropriate so that the embodiments described here can be implemented in an order other than that illustrated or described here. Furthermore, the term "includes" or "has", and any variation thereof, is intended to cover non-exclusive inclusion. For example, a process, method, system, product or device comprising a series of steps or units need not be limited to those steps or units that are clearly listed. Instead, it may include other steps or units that are not clearly listed or are inherent to these processes, methods, products, or devices.

Figure 2:
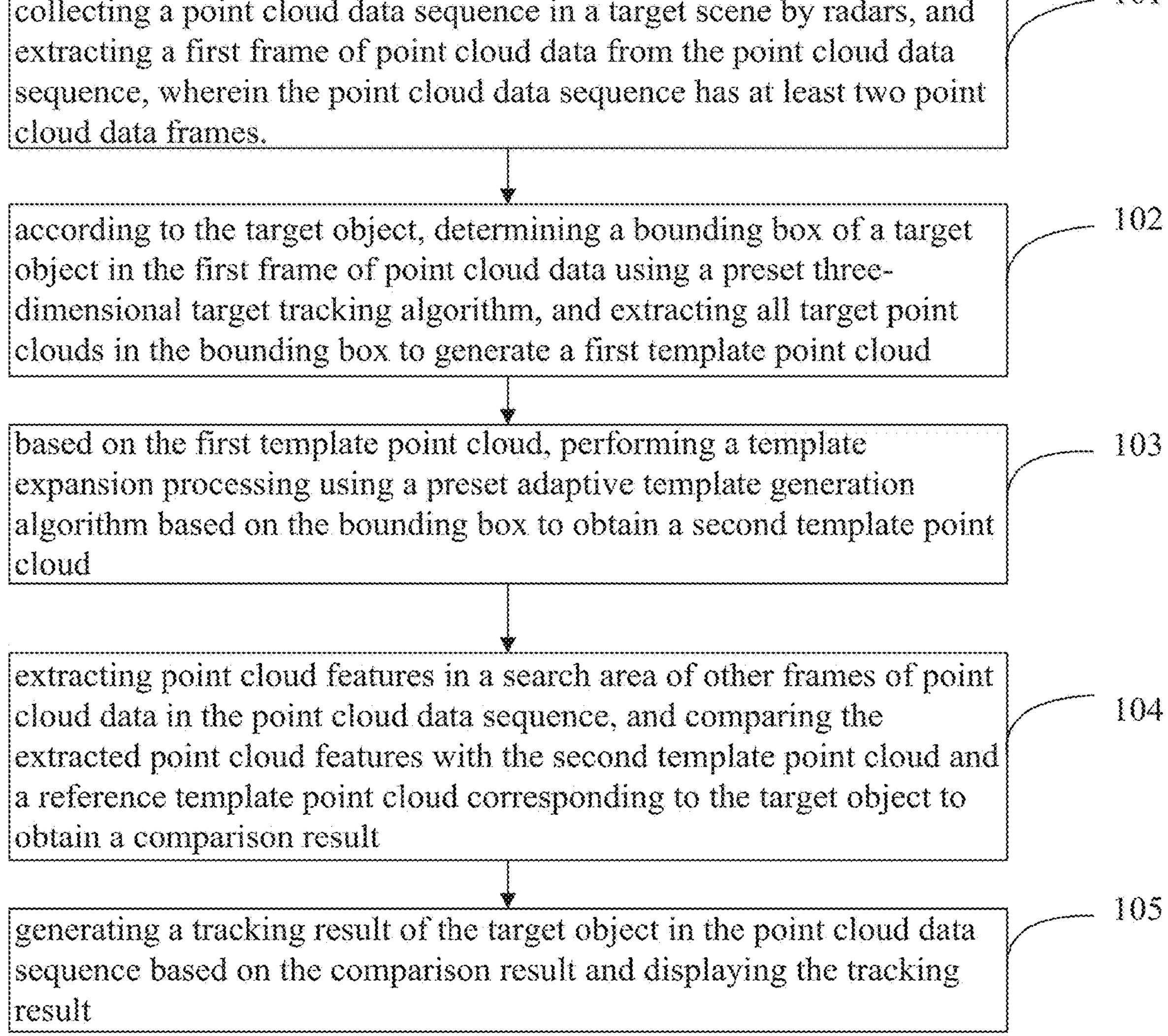
FIG. 2 is a schematic diagram of a target object tracking method in accordance with a first embodiment of the present disclosure.

For ease of understanding, the specific process of the embodiment of the invention is described below. Referring to FIGS. 1 and 2, a target object tracking method in accordance with a first embodiment of the present disclosure includes steps as follows.

Step S101, collecting a point cloud data sequence in a target scene by radars, and extracting a first frame of point cloud data from the point cloud data sequence, wherein the point cloud data sequence has at least two point cloud data frames.

In this embodiment, the point cloud data sequence can be understood as a set of point cloud video frames sorted in chronological order, which can be acquired by the lidars arranged on the device.

In an embodiment, the first frame of point cloud data is extracted based on a start collection time point of the lidar. The point cloud data frame corresponding to the start collection time point is extracted from the point cloud data sequence based on collection time points of the lidar, and the extracted point cloud data frame is taken as the first frame of point cloud data.

In practical applications, the point cloud data sequence collected in this step can be formed by the point cloud data frame at the current time point and at least one historical point cloud data frame. The point cloud data frame at the current time point is taken as the first frame of point cloud data, and the historical point cloud data frame is taken as the reference frame. A reference template of the target object and reference template features of the reference template are extracted from the reference frame.

Step S102, according to the target object, determining a bounding box of a target object in the first frame of point cloud data using a preset three-dimensional target tracking algorithm, and extracting all target point clouds in the bounding box to generate a first template point cloud.

In this step, the target object can be specified in advance or can be identified from the historical point cloud data. There is at least one target object.

In this embodiment, the target object can be determined using the preset three-dimensional target tracking algorithm to identify an annotation box from the historical point cloud data. The annotation box can provide label information of different dimensions such as three-dimensional label information or two-dimensional label information, and the identified target object is taken as the target object in the first frame of point cloud data.

Furthermore, key features of the target object are extracted according to the extracted annotation box and the three-dimensional target tracking algorithm is used to identify the corresponding key features from the first frame of point cloud data based on the key features. The bounding box of the target object is labeled, the target point cloud is extracted based on the bounding box, and the first template point cloud is generated from all the extracted point clouds.

In practical applications, the first template point cloud can also be an identification point cloud in the target scene, which can be understood as the point cloud feature of the basic object of the scene. The first template point cloud is taken as the benchmark for a subsequent target tracking, and the identification and tracking of the target object in subsequent point cloud data frames are performed based on this benchmark.

Step S103, based on the first template point cloud, performing a template expansion processing using a preset adaptive template generation algorithm based on the bounding box to obtain a second template point cloud.

In this step, whether a density of the point clouds in the point cloud data frame corresponding to the first template point cloud reaches a preset density threshold or not is detected. If not, template features of the target object in the first template point cloud are expanded using the preset adaptive template generation algorithm, and the point cloud features related to the target object in the first frame of point cloud data are fused into the template features, thereby enhancing the template features of the target object and improving the identifiability of the target object.

In this embodiment, after it is determined that the density of the point cloud in the point cloud data frame corresponding to the first template point cloud does not reach the preset density threshold, a first judgment result is obtained by judging whether the target point cloud density in the first template point cloud meets a preset density threshold. Based on the first judgment result, the preset adaptive template generation algorithm is used to generate the second template point cloud by taking a center point of the bounding box an origin and selecting several point clouds meeting a preset restricting condition from the point clouds surrounding the origin.

In practical applications, the density of the target point clouds is calculated by counting the number of target point clouds in the first template point cloud and an area of the bounding box. The calculated density is compared with the preset density threshold of the target point clouds. If the comparison result indicates that the calculated density is less than the present density threshold, the adaptive template generation algorithm is used to extract features of non-target point clouds in the bounding box or features of point clouds outside the bounding box and fuse the extracted features with the first template point cloud to generate the second template point cloud.

Step S104, extracting point cloud features in a search area of other frames of point cloud data in the point cloud data sequence, and comparing the extracted point cloud features with the second template point cloud and a reference template point cloud corresponding to the target object to obtain a comparison result.

In this step, a feature extractor is set at the same time to obtain the point cloud data of the frame next to the first frame of point cloud data, that is, the other frames of point cloud data are obtained from the point cloud data sequence, and the point cloud features are extracted from each subsequent frame of point cloud data by using the extraction algorithm of point cloud features, and then the extracted point cloud features are compared with the point cloud features in the second template point cloud.

In this embodiment, in the process of extracting the point cloud features from other frames of point cloud data, the search area is first determined in each frame of point cloud data, and then the point cloud features are extracted from the search area. Furthermore, the point cloud features, the second template point cloud and the reference template point cloud corresponding to the target object are input into the feature extractor for feature extraction. Finally, the extracted features are compared for selecting the most similar feature, and the comparison result is generated based on the selected feature.

Step S105, generating a tracking result of the target object in the point cloud data sequence based on the comparison result and displaying the tracking result.

In this embodiment, the point cloud with similar characteristics to the template feature in the first template point cloud is extracted from other frames of point cloud data, and a position of the extracted similar point cloud in the point cloud data frame is calculated, and then a target object tracking box is constructed and displayed in the corresponding point cloud data frame. Therefore, the template is expanded based on the adaptive template generation algorithm, so that the context information in the tracking scene can be used to assist the identification of the target object, which eliminates the noise in different environments even in the scene with sparse targets and positions and identifies the target object rapidly and accurately.

Figure 3:
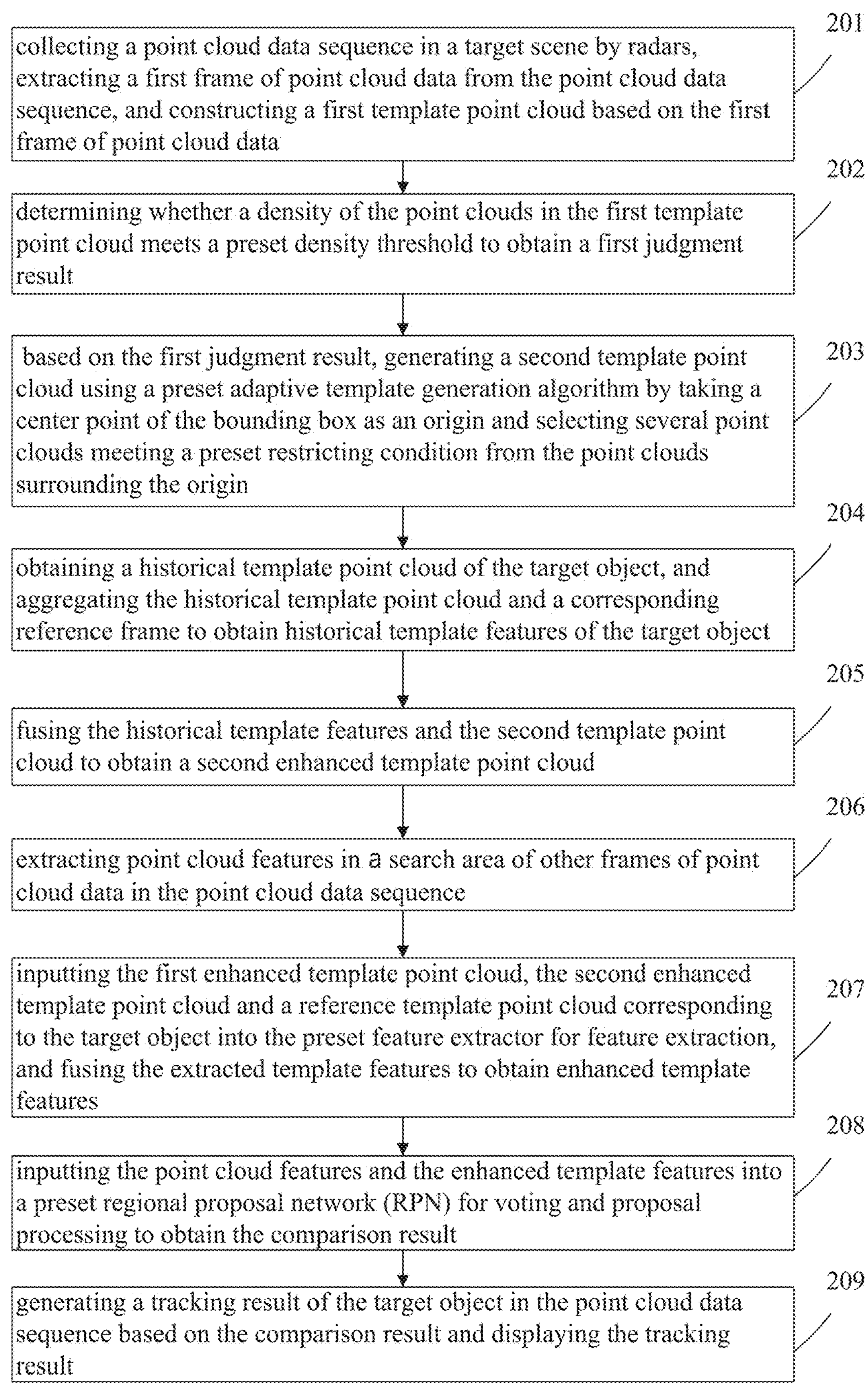
FIG. 3 is a schematic diagram of a target object tracking method in accordance with a second embodiment of the present disclosure.

Refer to FIGS. 1 and 3, in a second embodiment of the target object tracking method, a template and a reference are adaptively generated based on a density using an adaptive template generation (ATG) algorithm. Features of the template and the reference are extracted by PointNet++ with shared weights and then are input to a cross-frame aggregation (CFA) module for feature aggregation. The fused features are then input into a template-specific feature enhancement network with the searched features. In addition to using fused features and feature similarities, a target mask is also input into the CFA module as an additional feature. Finally, the enhanced features are used in a regional proposal network (RPN) for box regression. In an embodiment, a context-aware tracker (CAT) is designed to explore temporal information and spatial information of the target object, and the formula is as follows:

$$P^t = ATG(\hat{P}, B), P^r = ATG(\hat{P}^r, B^r),$$

$$\text{track}_{cat}(P^t, P^r, P^s) \mapsto (x, y, z, \theta).$$

In this embodiment, time information is utilized from an extra point cloud $\hat{P}^r$ in the reference frame. The templates generated from the first frame and the reference frame are recorded as $P^t$ and $P^r$ respectively. In addition, the template is obtained through ATG rather than through cropping out points directly from the bounding box. In the embodiment, the method includes steps as follows.

Step S201, collecting a point cloud data sequence in a target scene by radars, extracting a first frame of point cloud data from the point cloud data sequence, and constructing a first template point cloud based on the first frame of point cloud data.

In this embodiment, taking a driverless vehicle as an example, the driverless vehicle scans the surrounding road conditions in real-time through a lidar scanner, collects point clouds and sends the collected point clouds back to the vehicle; the vehicle extracts the first frame of point cloud data through an image processing software, and constructs the template point cloud and/or the template feature of the subsequent target object using the first frame of point cloud data, which can track the surrounding vehicles in real time so that the next decision can be made to avoid accidents.

In an embodiment, when the first template point cloud is constructed, according to the target object, the bounding box of the target in the first frame of point cloud data is determined using a preset three-dimensional target tracking algorithm and all target point clouds in the bounding box are extracted to generate a first template point cloud.

Step S202, determining whether a density of the point clouds in the first template point cloud meets a preset density threshold to obtain a first judgment result.

In this step, the density of the point clouds in the first template point cloud is determined through the density of the target point clouds in the first template point cloud. For example, the density of the target point clouds is calculated by counting the number of the target point clouds in the first template point cloud and an area of a bounding box. The calculated density is compared with the preset density threshold of the target point clouds to obtain a comparison result. If the comparison result indicates that the calculated density is less than the present density threshold, the adaptive template generation algorithm is used to extract the features of non-target point clouds in the bounding box or the features of point clouds outside the bounding box and the extracted features are fused with the first template point cloud to generate a second template point cloud.

Step S203, based on the first judgment result, generating a second template point cloud using a preset adaptive template generation algorithm by taking a center point of the bounding box as an origin and selecting several point clouds meeting a preset restricting condition from the point clouds surrounding the origin.

In this embodiment, the adaptive template generation algorithm includes a region fixed cropping generation strategy and a point fixed cropping generation strategy. The step S203 includes:

if the first judgment result indicates the calculated density meets the preset density threshold, generating the second template point cloud using the region fixed cropping generation strategy by taking the center point of the bounding box as the origin and selecting the point clouds which are distant from the origin within a first preset value; and if the first judgment result indicates that calculated density does not meet the preset density threshold, generating the second template point cloud using the point fixed cropping generation strategy by taking the center point of the bounding box as the origin and selecting a preset number of point clouds, wherein an Euclidean distance between the preset number of point clouds and the origin meets a second preset value.

In this embodiment, in order to further improve the feature accuracy in the second template point cloud, the step S203 further includes:

constructing a point cloud matrix based on the selected point clouds;

determining whether each point cloud in the point cloud matrix is located in the bounding box to obtain a second judgment result;

based on the second judgment result, converting the point cloud matrix into a target mask; and fusing the target mask and the second template point cloud to obtain a first enhanced template point cloud.

Step S204, obtaining a historical template point cloud of the target object, and aggregating the historical template point cloud and a corresponding reference frame to obtain historical template features of the target object.

In an embodiment, step S204 further includes:

extracting the features of the historical template point cloud and the corresponding historical reference frame respectively using a preset feature extractor to obtain multiple historical features of the historical template point cloud and historical reference template features;

calculating a paired distance between each historical feature and the corresponding historical reference template feature using a distance calculation formula;

selecting the first K reference features which are most similar to each template feature from the historical reference frame based on the paired distance using a K-nearest neighbor algorithm and constructing K pairs of similar template features; and fusing the K pairs of similar template features using a multi-level neural network to obtain the historical template features of the target object.

The distance calculation formula is:

$$FDist\in \mathbb{R}^{M_1\times M_1}=\text{Pairwise}(F^r,F^t),$$

wherein $M_1$ represents the number of the features in the reference and the template, FDist represents a distance map of a $$M_1\times M_1,\ f_i^t\in F^t$$

represents that $$f_i^t$$

is the i-th template feature of a template feature set $$F^t,\ f_i^r\in F^r$$

represents that $$f_i^r$$

is the i-th reference feature of a reference feature set $F^r$, and $FDist_{i,j}$ indicates the distance between $$f_i^t\in F^t \text{ and } f_i^r\in F^r.$$

Step S205, fusing the historical template features and the second template point cloud to obtain a second enhanced template point cloud.

Figure 4:
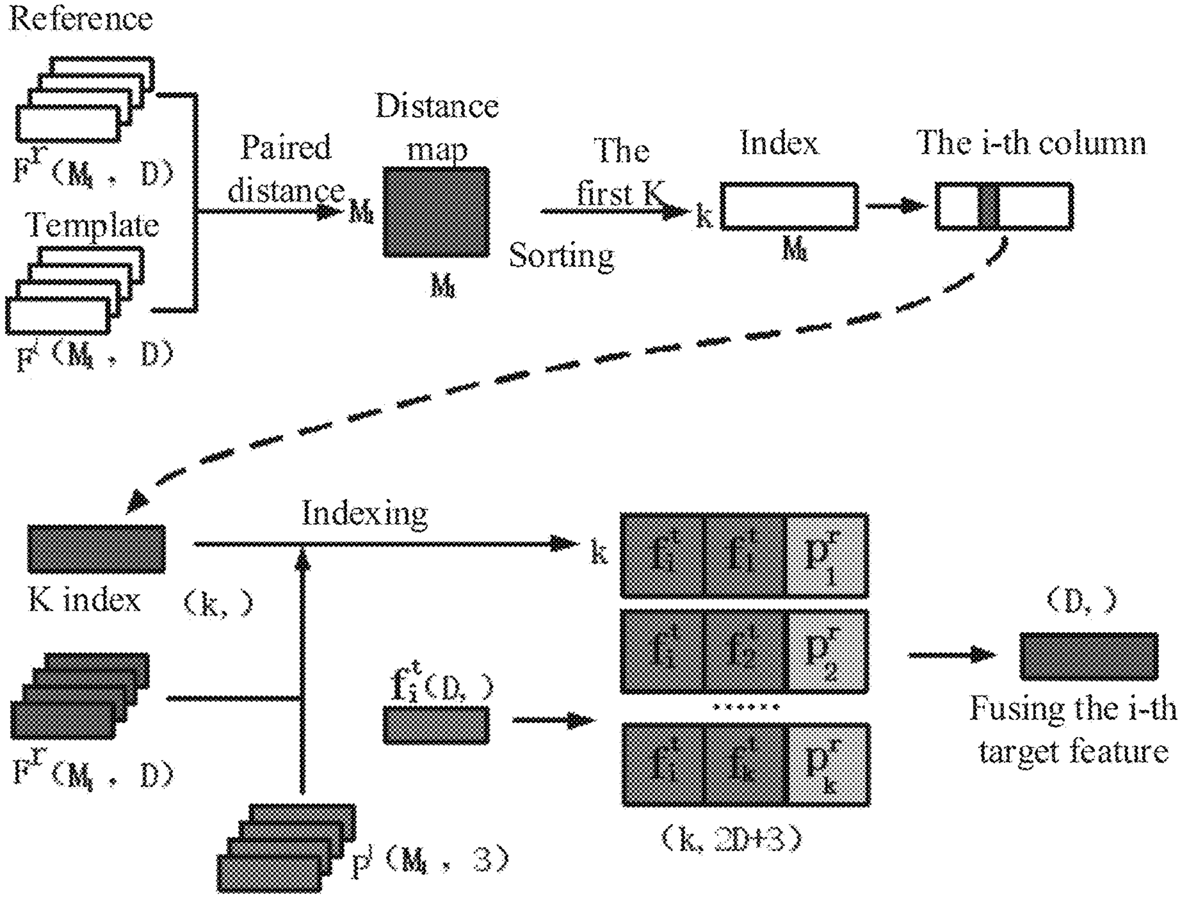
FIG. 4 is a schematic diagram of showing cross-frame aggregation enhanced template point cloud of the present disclosure.

In this embodiment, although the model generated using the ATG algorithm provides more clues around the target object, the model is more easily affected by the changing environment. The CFA module aims to eliminate this negative effect and take advantage of the temporal information in the lidar sequence. As shown in FIG. 4, the CFA module uses reference frames from the list of historical tracks. In the process using the CFA module, reference features are aggregated into the template features to provide the network with temporal information, such as changes in speed and scene.

Step S206, extracting point cloud features in a search area of other frames of point cloud data in the point cloud data sequence.

Step S207, inputting the first enhanced template point cloud, the second enhanced template point cloud and a reference template point cloud corresponding to the target object into the preset feature extractor for feature extraction, and fusing the extracted template features to obtain enhanced template features.

Step S208, inputting the point cloud features and the enhanced template features into a preset regional proposal network (RPN) for voting and proposal processing to obtain the comparison result.

Figure 5:
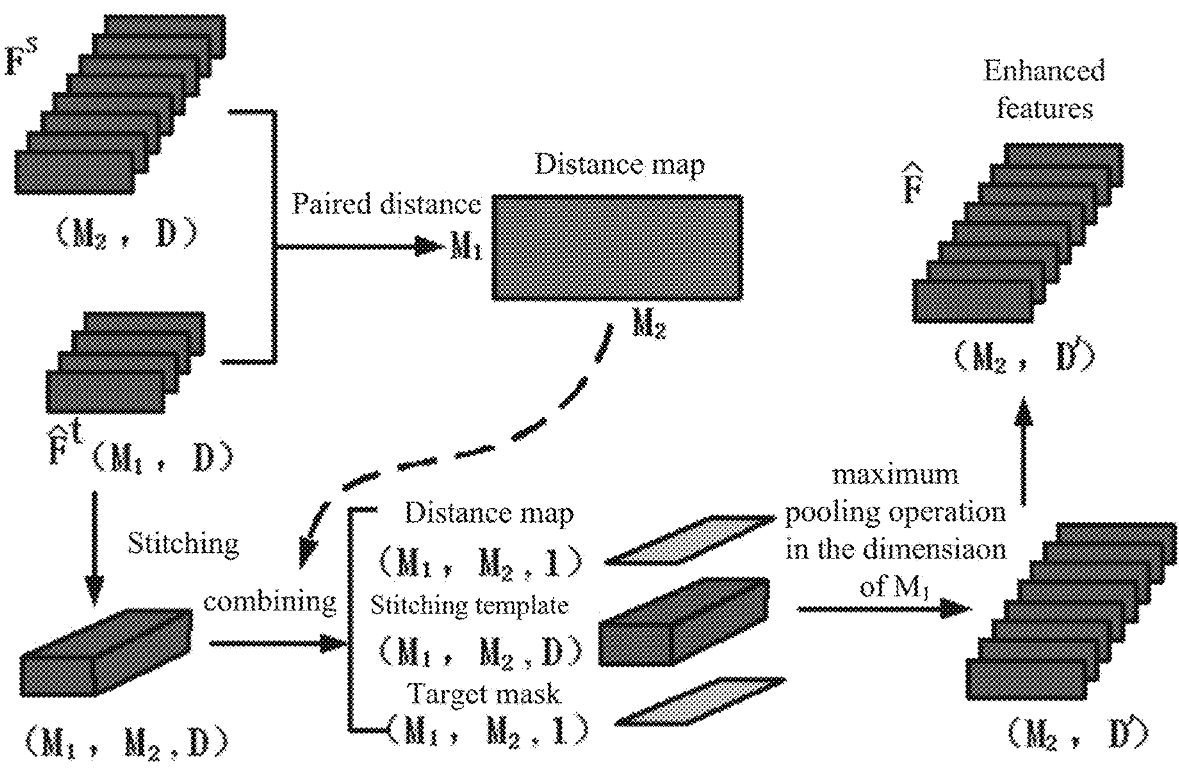
FIG. 5 is a schematic diagram showing feature enhancement of a target object of the present disclosure.

In this step, the enhanced template features are fused into the search area for the feature enhancement of the target. The whole process is illustrated in FIG. 5. At first, the above formula is used to calculate a similar feature distance between the feature of the search area and the template feature (i.e., $F^s$ and $F^t$) to obtain a distance map in the shape of $(M_1,M_2)$. After that, the template features are copied $M_2$ times to form the dimensions of $(M_1,M_2,D)$. Then the distance map, the copied template features, and the target mask from the ATG are combined according to the dimensions of the channel. Finally, an enhanced feature of the search area can be obtained using MLP after the maximum pooling operation. This enhanced feature of the search area includes information of the template and the reference which is input to a subsequent RPN to obtain the final bounding box.

Step S209, generating a tracking result of the target object in the point cloud data sequence based on the comparison result and displaying the tracking result.

In this embodiment, the functions of the above steps can be realized specifically by designing a perceptive tracker (CAT), which includes the adaptive template generation algorithm and the CFA module.

The adaptive template generation algorithm is designed to adaptively crop out the target according to the density of objects. More precisely, two specific template generation strategies are used, that is, the region fixed cropping strategy and the point fixed cropping strategy. The region fixed cropping strategy is a template generation strategy commonly used in prior art, such as 2D SOT and 3D SOT, which can crop out the points in the fixed region, that is, the points in the bounding box of the bounding box of the target object. The point fixed cropping strategy uses k-Nearest neighbor (k-NN) algorithm to crop out a template with fixed points. The Euclidean distance between each point on the template and the center of the bounding box can be calculated as follows:

$$\mathrm{Dist} \in \mathbb{R}^{1\times N} = \mathrm{Pairwise}(\mathrm{Center}(B), P),$$

Wherein Center(•) and $P \in \mathbb{R}^{N\times 3}$ represent the center of the bounding box and the point in a given frame respectively, and Pairwise(•) is the distance between the two input point clouds $l_2$. argsort is used to select the closest $N_1$ points to obtain the template $P^t \in \mathbb{R}^{N_1\times 3}$. In the experiment, a threshold σ is set to determine whether the target point cloud is dense enough. If the number of the points in the bounding box is greater than the threshold, the region fixed cropping strategy is used. Otherwise, the point fixed cropping strategy is used.

In addition, in order to eliminate the background noise points in the expanded template, the target mask is further designed. In the expanded template point cloud, if a point is in the bounding box, the position of the point in the target mask is set to 1, otherwise the position of the point in the target mask is set to 0. After the target mask is obtained, the target mask is input into the feature fusion to generate more discriminating features. In this way, the size of the template can be expanded adaptively in the situation that the point cloud is sparse, and a target object identifier can be provided through the target mask to enhance the tracking process.

For the CFA module, although the model generated using the ATG algorithm provides more clues surrounding the object, the model is more easily affected by the changing environment. The CFA module aims to eliminate this negative effect and take advantage of the temporal information in the lidar sequence. As shown in FIG. 4, the CFA module uses reference frames from the list of historical tracks. In the process using the CFA module, reference features are aggregated into template features to provide the network with temporal information, such as changes in speed and scene. Specifically, the template $P^t$ and the reference $P^r$ are generated by the first frame and the reference frame via ATG, wherein the dimensions of the template and the reference are equal to $R^{N_1\times 3}$. The template and the reference are then input into the same feature extractor (that is, the PointNet++) to obtain the feature $F^t, F^r \in R^{M_1\times D}$. The paired distance $l_2$ between each feature in $F^r$ and each feature in $F^t$ can be calculated as follows:

$$F\mathrm{Dist} \in \mathbb{R}^{M_1\times M_1} = \mathrm{Pairwise}(F^r, F^t),$$

Wherein $M_1$ represents the number of the features in the reference and the template, FDist represents a distance map of a $$M_1 \times M_1,\ f_i^t \in F^t$$

represents that $$f_i^t$$

is the i-th template feature of a template feature set $$F^t,\ f_i^r \in F^r$$

represents that $$f_i^r$$

is the i-th reference feature of a reference feature set $F^r$, and $\mathrm{FDist}_{i,j}$ indicates the distance between $$f_i^t \in F^t \text{ and } f_i^r \in F^r.$$

As shown in FIG. 5, the k-NN algorithm is then used. The k reference features that are most similar to each template feature are selected to form an index matrix, wherein the i-th column is the index of the k nearest neighbors of the i-th template feature at a distance $l_2$ from the i-th template feature. In addition, for the i-th reference feature $$f_i^r,$$

the i-th column in the index matrix above is used to select the nearest k template points of the i-th reference feature. Then, a PointNet[3] is used to aggregate the k pairs of features:

$$\hat{f}_i^t = \underset{j\in\{1,2,\ldots,k\}}{MaxPool}\{MLP([f_i^t; f_j^r; p_j^r])\}$$

Wherein $$[f_i^t; f_j^r; p_j^r]$$

indicates a stitching operation. The CFA module is beneficial to discard false matches and avoid interference from background noise, thereby generating a more discriminating and more temporal-aware template feature $$\hat{F}^t = \{\hat{f}_i^t\}_{i=1}^{M_1}$$

and facilitating subsequent feature aggregation.

Furthermore, after the feature enhancement is obtained, the enhanced template features and the search area are fused. The entire process is shown in FIG. 5. At first, the similar feature distance between the feature of the search area and the template feature (i.e., $F^s$ and $F^t$) is calculated through the above formula to obtain the distance map in the shape of $(M_1,M_2)$. After that, the template feature is copied $M_2$ times to form the dimensions of $(M_1,M_2,D)$. Then the distance map, the copied template features, and the target mask ATG are combined according to the dimensions of the channel. Finally, the enhanced feature $\hat{F}$ of the search area can be obtained using MLP after the maximum pooling operation. This enhanced feature of the search area includes template and reference information and is input to a subsequent RPN to obtain the final bounding box.

The structure of CAT provided in this embodiment is obtained by combining the ATG algorithm, the CFA module, and the advanced feature enhancement into P2B. As shown in FIGS. 1 and 4, the template and the reference are at first generated by CAT using the ATG algorithm. The features of the template and the reference are then extracted using PointNet++ with shared weights. The information of the reference and the template are fused in the CFA module to generate the fused template features. These features are then input to the feature enhancement corresponding to the template along with the features of the search area, to generate the enhanced features for the final prediction. Finally, the enhanced features are used in the RPN. Components of the RPN are taken from VoteNet (voting and proposal modules). For fair comparison, the structure of the RPN in CAT is the same as that of P2B.

The network is enhanced using size-aware and position-aware information through a point-to-box relationship (BoxCloud). Boxcloud is a distance map $C\in\mathbb{R}^{N_1\times 9}$ from P to nine predefined key points (eight corner points and one center point of the bounding box). This improvement makes few changes to the structure of the network (except for the input channel and the features in the feature enhancements), but significantly improves overall performance of the network.

As stated above, through the implementation of the above method, compared with SOT based on two-dimensional images which has been well studied, SOT on three-dimensional point cloud is a relatively new research field. In order to solve the SOT task on three-dimensional point cloud, the present disclosure provides a new solution, called CAT, to achieve three-dimensional SOT through spatial context and temporal context learning from the lidar sequence.

Furthermore, the ATG algorithm is used to solve the problem of insufficient template information in the scenes with sparse lidars. Compared with the previous three-dimensional SOT method in which only the point cloud in the target bounding box is used as the template, CAT adaptively uses the surrounding environmental cues by including the environment outside the target bounding box into the template. This template generation strategy is more efficient and reasonable than the previous region fixed strategy, especially when the target object has only a few points.

In addition, the CFA module is used to enhance the feature representation of the template by aggregating the features of the historical reference frames. Even in the situation that the point cloud is extremely sparse, the solution can still allow CAT to have a stable performance.

Figure 6:
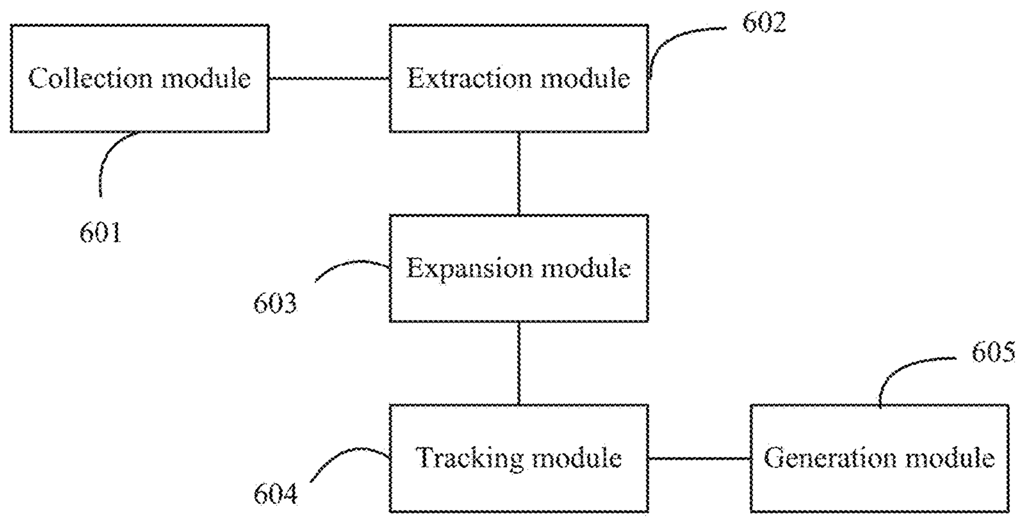
FIG. 6 is a schematic diagram of a target object tracking device in accordance with a first embodiment of the present disclosure.

The target object tracking method in the embodiment of the present disclosure is described above, and a target object tracking device in the embodiment of the present disclosure is described below. As shown in FIG. 6, in an embodiment, the target object tracking device includes:

- a collection module 601, configured to a collect point cloud data sequence in a target scene by radars and extract a first frame of point cloud data from the point cloud data sequence, wherein the point cloud data sequence includes at least two frames of point cloud data;
- an extraction module 602, configured to, according to the target object, determine a bounding box of a target object in the first frame of point cloud data using a preset three-dimensional target tracking algorithm and extract all target point clouds in the bounding box to generate a first template point cloud;
- an expansion module 603, configured to perform a template expansion processing based on the first template point cloud using a preset adaptive template generation algorithm based on the bounding box to obtain a second template point cloud;
- a tracking module 604, configured to extract point cloud features in a search area of other frames of point cloud data in the point cloud data sequence, and compare the extracted point cloud features with the second template point cloud and a reference template point cloud corresponding to the target object to obtain a comparison result; and
- a generation module 605, configured to generate a tracking result of the target object in the point cloud data sequence based on the comparison result and display the tracking result.

The device provided in this embodiment collects the point cloud data sequence in the target scene by radars and extracts the first frame of point cloud data from the point cloud data sequence. The bounding box of the target object in the first frame of point cloud data is determined using the preset three-dimensional target tracking algorithm according to the target object, and all the target point clouds in the bounding box are extracted to generate the first template point cloud. The template expansion processing is performed based on the bounding box using the preset adaptive template generation algorithm to obtain the second template point cloud, the point cloud features in the search area of other frames of point cloud data of the point cloud data sequence are extracted, and the point cloud features are compared with the second template point cloud and the reference template point cloud corresponding to the target object to obtain the comparison result. Based on the comparison result, the tracking result of the target object in the point cloud data sequence is generated and displayed. The device expands the template based on the adaptive template generation algorithm, so that context information in the tracking scene can be used to assist the identification of the target object, which eliminates the noise in different environments even in a scene with sparse targets to position and identify the target object quickly and accurately.

Figure 7:
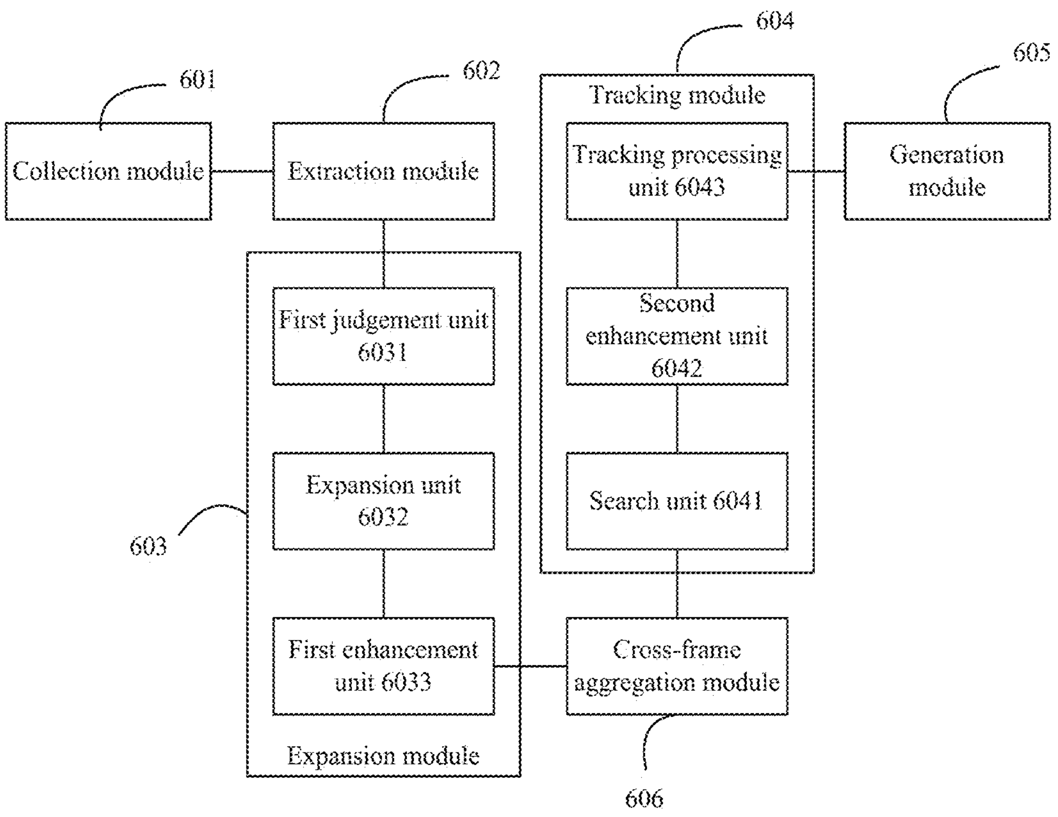
FIG. 7 is a schematic diagram of a target object tracking device in accordance with another embodiment of the present disclosure.

Furthermore, as shown in FIG. 7, which is a detailed schematic diagram of each module of the target object tracking device; in another embodiment, the expansion module 603 includes:

a first judgment unit 6031, configured to determine whether a density of the point clouds in the first template point cloud meets a preset density threshold and obtain a first judgment result;

an expansion unit 6032, configured to, based on the first judgment result, generate the second template point cloud using the preset adaptive template generation algorithm by taking a center point of the bounding box as an origin and selecting several point clouds meeting the preset restricting condition from the point clouds surrounding the origin. In another embodiment, the adaptive template generation algorithm includes a region fixed cropping generation strategy and a point fixed cropping generation strategy. In an embodiment, the expansion unit 6032 is configured to:

if the first judgment result indicates that the density of the point clouds in the first template point cloud meets the preset density threshold, generate the second template point cloud using the region fixed cropping generation strategy by taking the center point of the bounding box as the origin and selecting a preset number of point clouds which are distant from the origin within a first preset value; and if the first judgment result indicates that the density of the point clouds in the first template point cloud does not meet the preset density threshold, generate the second template point cloud using by taking the center point of the bounding box as the origin and selecting a preset number of point clouds surrounding the origin, wherein an Euclidean distance between the preset number of point clouds and the origin meets a second preset value.

In another embodiment, the expansion module 603 further includes a first enhancement unit 6033 configured to:

construct a point cloud matrix based on the selected point clouds;

determine whether each point cloud in the point cloud matrix is located in the bounding box to obtain a second judgment result;

based on the second judgment result, covert the point cloud matrix into a target mask; and fuse the target mask and the second template point cloud to obtain a first enhanced template point cloud.

In another embodiment, the target object tracking device also includes a cross-frame aggregation module 606 configured to:

obtain a historical template point cloud of the target object, and aggregate the historical template point cloud and a corresponding historical reference frame to obtain historical template features of the target object; and according to the historical template features and the second template point cloud, obtain a second enhanced template point cloud.

In another embodiment, the tracking module 604 includes:

a search unit 6041, configured to extract point cloud features in the search area of other frames of point cloud data in the point cloud data sequence;

a second enhancement unit 6042, configured to input the first enhanced template point cloud, the second enhanced template point cloud and the reference template point cloud corresponding to the target object into a preset feature extractor for feature extraction, and perform fusion processing on the extracted template features to obtain enhanced template features; and a tracking processing unit 6043, configured to input the point cloud features and the enhanced template features into a preset regional proposal network for voting and proposal processing to obtain the comparison result.

In another embodiment, the cross-frame aggregation module 606 is configured to:

extract the features of the historical template point cloud and the corresponding historical reference frame respectively using the preset feature extractor to obtain multiple historical features of the historical template point cloud and historical reference template features;

calculate a paired distance between each historical feature and the corresponding historical reference template feature using a distance calculation formula;

select the first K reference features which are most similar to each template feature from the historical reference frame based on the paired distance using a K-nearest neighbor algorithm and construct K pairs of similar template features; and fuse the K pairs of similar template features using a multi-level neural network to obtain the historical template features of the target object.

Wherein the distance calculation formula is as follows:

$$F\text{Dist} \in \mathbb{R}^{M_1 \times M_1} = \text{Pairwise}(F^r, F^t),$$

Wherein $M_1$ represents the number of the features in the reference and the template, FDist represents a distance map of a $$M_1 \times M_1; f_i^t \in F^t$$

represents that $$f_i^t$$

is the i-th template feature of a template feature set $$F^t, f_i^r \in F^r$$

represents that $$f_i^r$$

is the i-th reference feature of a reference feature set $F^r$, and $FDist_{i,j}$ indicates the distance between $$f_i^t \in F^t \text{ and } f_i^r \in F^r.$$

Through the implementation of the above device, the template is expanded based on the adaptive template generation algorithm, so that the context information in the tracking scene can be used to assist the identification of the target object, and the noise in different environments can be eliminated even in a scene with sparse targets, and the target object can be rapidly and accurately tracked and identified.

The target object tracking device in the embodiments as shown in FIG. 6 and FIG. 7 are described above from a perspective of modular function entity. The target object tracking device in the embodiments are described below from a perspective of hardware processing.

Figure 8:
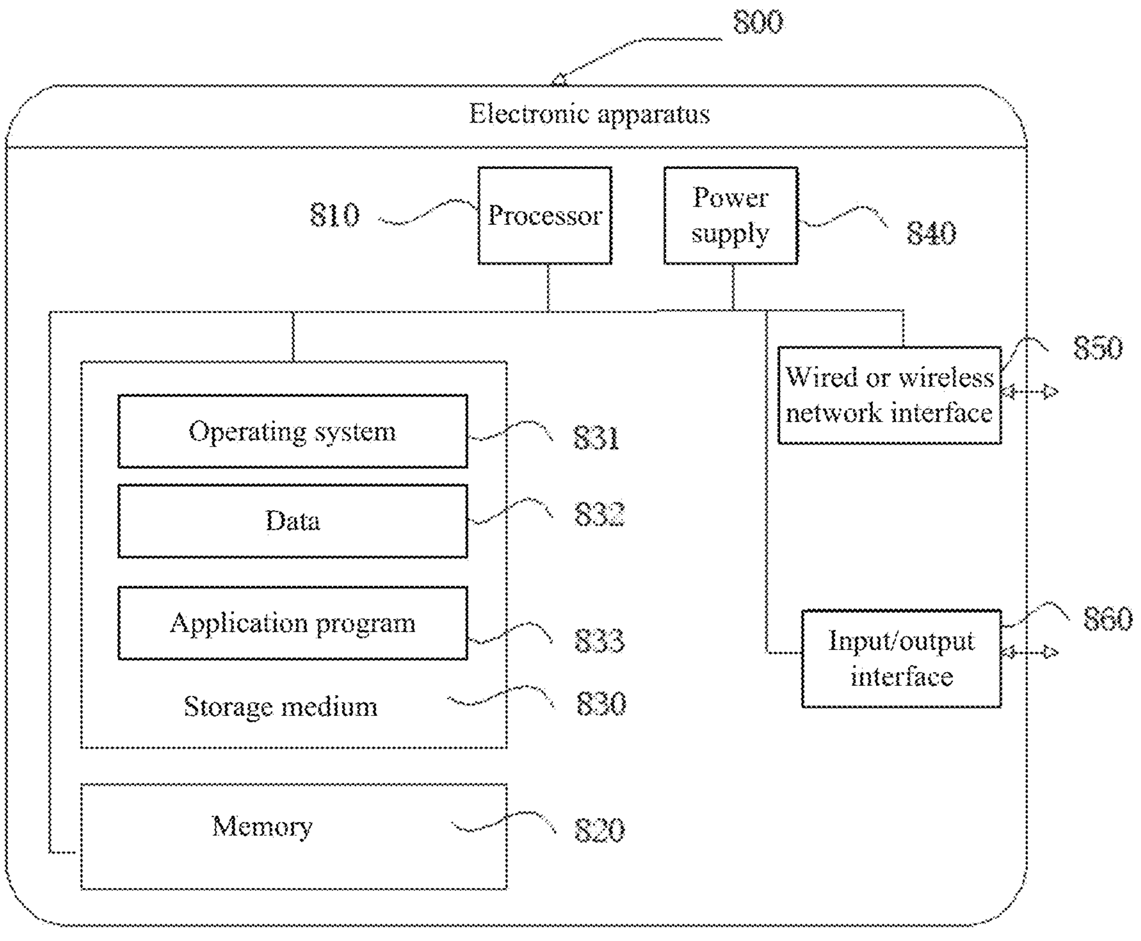
FIG. 8 is a schematic diagram of an electronic apparatus in accordance with an embodiment of the present disclosure.

FIG. 8 is a schematic diagram showing the structure of an electronic apparatus. The electronic apparatus 800 may vary considerably depending on configuration or performance and may include one or more central processing units (CPUs) 810 (e.g., one or more processors), a memory 820, a storage medium 830 for storing one or more storage application programs 833 or data 832 (for example, one or more mass storage devices). The memory 820 and the storage medium 830 can be transient or persistent. The application programs stored on the storage medium 830 may include one or more modules (not shown in the drawings), and each module may include a series of instruction operations on the electronic apparatus 800. Furthermore, the processor 810 can be set to communicate with the storage medium 830 such that the series of instruction stored in the storage medium 830 can be implemented on the electronic apparatus 800.

The electronic apparatus 800 may also include one or more power supplies 840, one or more wired or wireless network interfaces 850, one or more input/output interfaces 860, and/or, one or more operating systems 831 such as the WindowsServe, MacOSX, Unix, Linux, and FreeBSD. A person skilled in the art may understand that the structure of the electronic apparatus may include more or fewer components than those shown in the FIG. 8, or some components may be combined, or a different component deployment may be used.

The present disclosure further provides an electronic apparatus including a memory, a processor and a computer program stored in the memory and running on the processor. When being executed by the processor, the computer program implements each step in the target object tracking method provided by the above embodiments.

The present disclosure further provides a computer-readable storage medium. The computer-readable storage medium may be a non-volatile or a volatile computer readable storage medium. The computer-readable storage medium stores at least one instruction or a computer program, and when being executed, the at least one instruction or computer program causes the computer to perform the steps of the target object tracking method provided by the above embodiment.

Those skilled in the art may clearly learn about that specific working processes of the system, device and unit described above may refer to the corresponding processes in the method embodiments and will not be elaborated, herein for convenient and brief description.

When the integrated unit is implemented in form of software functional unit and sold or used as an independent product, the integrated unit may be stored in a computer-readable storage medium. Based on such an understanding, the technical solutions of the disclosure substantially or parts making contributions to the conventional art or all or part of the technical solutions may be embodied in form of software product, and the computer software product is stored in a storage medium, including a plurality of instructions configured to enable a computer device (which may be a personal computer, a server, a network device or the like) to execute all or part of the steps of the method in each embodiment of the disclosure. The storage medium includes: various media capable of storing program codes such as a U disk, a mobile hard disk, a ROM, a RAM, a magnetic disk or an optical disk.

It is understandable that the above-mentioned technical features may be used in any combination without limitation. The above descriptions are only the embodiments of the present disclosure, which do not limit the scope of the present disclosure. Any equivalent structure or equivalent process transformation made by using the content of the description and drawings of the present disclosure, or directly or indirectly applied to other related technologies in the same way, all fields are included in the scope of patent protection of the present disclosure.

What is claimed is:

1. A target object tracking method, wherein the method comprises:

collecting a point cloud data sequence in a target scene by radars, and extracting a first frame of point cloud data from the point cloud data sequence, wherein the point cloud data sequence has at least two frames of point cloud data;

determining a bounding box of a target object in the first frame of point cloud data using a preset three-dimensional target tracking algorithm according to the target, and extracting all target point clouds in the bounding box to generate a first template point cloud;

based on the first template point cloud, performing a template expansion processing using a preset adaptive template generation algorithm based on the bounding box to obtain a second template point cloud;

extracting point cloud features in a search area of other frames of point cloud data in the point cloud data sequence, and comparing the point cloud features with the second template point cloud and a reference template point cloud corresponding to the target object to obtain a comparison result; and generating a tracking result of the target object in the point cloud data sequence based on the comparison result and displaying the tracking result.

2. The target object tracking method of claim 1, wherein the based on the first template point cloud, performing a template expansion processing using a preset adaptive template generation algorithm based on the bounding box to obtain a second template point cloud bounding box comprises:

determining whether a density of point clouds in the first template point cloud meets a preset density threshold to obtain a first judgment result;

based on the first judgment result, generating the second template point cloud using the preset adaptive template generation algorithm by taking a center point of the bounding box as an origin and selecting several point clouds meeting a preset restricting condition from the point clouds surrounding the origin.

3. An electronic apparatus having a memory, a processor, and a computer program stored in the memory and capable of running in the processor, wherein, when being executed by the processor, the computer program implements the steps in the target object tracking method of claim 1.

4. A non-transitory computer-readable storage medium with a computer program stored thereon, wherein, when being executed by the processor, the computer program implements the steps in the target object tracking method of claim 1.

5. The target object tracking method of claim 2, wherein the adaptive template generation algorithm comprises a region fixed cropping generation strategy and a point fixed cropping generation strategy; the based on the first judgment result, generate the second template point cloud using the preset adaptive template generation algorithm to by taking center point of the bounding box as an origin and selecting several point clouds meeting a preset restricting condition from point clouds surrounding the origin comprises:

if the first judgment result indicates the calculated density meets the preset density threshold, generating the second template point cloud using the region fixed cropping generation strategy by taking the center point of the bounding box as the origin and selecting point clouds which are distant from the origin within a first preset value; and if the first judgment result indicates the calculated density does not meet the preset density threshold, generating the second template point cloud using the point fixed cropping generation strategy by taking the center point of the bounding box as the origin and selecting a preset number of point clouds, wherein an Euclidean distance between the preset number of point clouds and the origin meets a second preset value.

6. An electronic apparatus having a memory, a processor, and a computer program stored in the memory and capable of running in the processor, wherein, when being executed by the processor, the computer program implements the steps in the target object tracking method of claim 2.

7. A non-transitory computer-readable storage medium with a computer program stored thereon, wherein, when being executed by the processor, the computer program implements the steps in the target object tracking method of claim 2.

8. The target object tracking method of claim 5, wherein the based on the first judgment result, generating the second template point cloud using the preset adaptive template generation algorithm by taking center point of the bounding box as an origin and selecting several point clouds meeting a preset restricting condition from point clouds surrounding the origin comprises:

constructing a point cloud matrix based on the selected point clouds;

determining whether each point cloud in the point cloud matrix is located in the bounding box to obtain a second judgment result;

based on the second judgment result, converting the point cloud matrix into a target mask; and fusing the target mask and the second template point cloud to obtain a first enhanced template point cloud.

9. An electronic apparatus having a memory, a processor, and a computer program stored in the memory and capable of running in the processor, wherein, when being executed by the processor, the computer program implements the steps in the target object tracking method of claim 5.

10. A non-transitory computer-readable storage medium with a computer program stored thereon, wherein, when being executed by the processor, the computer program implements the steps in the target object tracking method of claim 5.

11. The target object tracking method of claim 8, wherein the based on the first judgment result, generating the second template point cloud using the preset adaptive template generation algorithm by taking center point of the bounding box as an origin and selecting several point clouds meeting a preset restricting condition from point clouds surrounding the origin further comprises:

obtaining a historical template point cloud of the target object, and aggregating the historical template point cloud and a corresponding reference frame to obtain historical template features of the target object; and fusing the historical template features and the second template point cloud to obtain a second enhanced template point cloud.

12. An electronic apparatus having a memory, a processor, and a computer program stored in the memory and capable of running in the processor, wherein, when being executed by the processor, the computer program implements the steps in the target object tracking method of claim 8.

13. A non-transitory computer-readable storage medium with a computer program stored thereon, wherein, when being executed by the processor, the computer program implements the steps in the target object tracking method of claim 8.

14. The target object tracking method of claim 11, wherein the extracting point cloud features in a search area of other frames of point cloud data in the point cloud data sequence, and comparing the point cloud features with the second template point cloud and a reference template point cloud corresponding to the target object to obtain a comparison result comprises:

extracting the point cloud features in the search area of other frames of point cloud data in the point cloud data sequence;

inputting the first enhanced template point cloud, the second enhanced template point cloud and the reference template point cloud corresponding to the target object into a preset feature extractor for feature extraction, and fusing the extracted template features to obtain enhanced template features; and inputting the point cloud features and the enhanced template features into a preset regional proposal network for voting and proposal processing to obtain the comparison result.

15. The target object tracking method of claim 11, wherein the aggregating the historical template point cloud and a corresponding reference frame to obtain historical template features of the target object comprises:

extracting the features of the historical template point cloud and the corresponding historical reference frame respectively using a preset feature extractor to obtain multiple historical features of the historical template point cloud and historical reference template features;

calculating a paired distance between each historical feature and the corresponding historical reference template feature using a distance calculation formula;

selecting the first K reference features which are most similar to each template feature from the historical reference frame based on the paired distance using a K-nearest neighbor algorithm and constructing K pairs of similar template features;

fusing the K pairs of similar template features using a multi-level neural network to obtain the historical template features of the target object;

wherein, the distance calculation formula is:

$$FDist \in \mathbb{R}^{M_1 \times M_1} = \text{Pairwise}(F^r, F^t),$$

wherein $M_1$ represents the number of the features in the reference and template, FDist represents a distance map of a $$M_1 \times M_1,\ f_i^t \in F^t$$

represents that $$f_i^t$$

is an i-th template feature of a template feature set $$F^t,\ f_i^r \in F^r$$

represents that $$f_i^r$$

is an i-th reference feature of a reference feature set $F^r$, and $FDist_{i,j}$ indicates the distance between $$f_i^t \in F^t \text{ and } f_i^r \in F^r.$$

16. An electronic apparatus having a memory, a processor, and a computer program stored in the memory and capable of running in the processor, wherein, when being executed by the processor, the computer program implements the steps in the target object tracking method of claim 11.

17. A non-transitory computer-readable storage medium with a computer program stored thereon, wherein, when being executed by the processor, the computer program implements the steps in the target object tracking method of claim 11.

18. An electronic apparatus having a memory, a processor, and a computer program stored in the memory and capable of running in the processor, wherein, when being executed by the processor, the computer program implements the steps in the target object tracking method of claim 14.

19. An electronic apparatus having a memory, a processor, and a computer program stored in the memory and capable of running in the processor, wherein, when being executed by the processor, the computer program implements the steps in the target object tracking method of claim 15.

20. A target object tracking device, wherein the target object tracking device comprises:

a collection module, configured to collect a point cloud data sequence in a target scene by radars, and extract a first frame of point cloud data from the point cloud data sequence, wherein the point cloud data sequence has at least two frames of point cloud data;

an extraction module, configured to determine a bounding box of a target object in the first frame of point cloud data using a preset three-dimensional target tracking algorithm according to the target object, and extract all target point clouds in the bounding box to generate the first template point cloud;

an expansion module, configured to perform a template expansion processing based on the first template point cloud using a preset adaptive template generation algorithm based on the bounding box to obtain a second template point cloud;

a tracking module, configured to extract point cloud features in a search area of other frames of point cloud data in the point cloud data sequence, and compare the extracted point cloud features with the second template point cloud and a reference template point cloud corresponding to the target object to obtain a comparison result; and a generation module, configured to generate a tracking result of the target object in the point cloud data sequence based on the comparison result and displaying the tracking result.

* * * * *